United States Patent
Hashimoto et al.

(10) Patent No.: US 7,907,496 B2
(45) Date of Patent: Mar. 15, 2011

(54) TWO-DIMENSIONAL DEMODULATION METHOD, TWO-DIMENSIONAL DEMODULATION APPARATUS AND HOLOGRAPHIC APPARATUS

(75) Inventors: Michikazu Hashimoto, Tsurugashima (JP); Kiyoshi Tateishi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 365 days.

(21) Appl. No.: 12/295,597

(22) PCT Filed: Mar. 16, 2007

(86) PCT No.: PCT/JP2007/055407
§ 371 (c)(1),
(2), (4) Date: Sep. 30, 2008

(87) PCT Pub. No.: WO2007/114029
PCT Pub. Date: Oct. 11, 2007

(65) Prior Publication Data
US 2009/0316558 A1 Dec. 24, 2009

(30) Foreign Application Priority Data
Mar. 31, 2006 (JP) ................................. 2006-097563

(51) Int. Cl.
*G11B 7/00* (2006.01)
(52) U.S. Cl. ..................... 369/103; 369/124.01; 369/120
(58) Field of Classification Search .................. 369/103, 369/112.1, 112.15; 359/3, 10, 22, 32
See application file for complete search history.

(56) References Cited

U.S. PATENT DOCUMENTS

| 5,740,184 A | 4/1998 | Heanue et al. |
| 2005/0002310 A1* | 1/2005 | Song et al. ..................... 369/103 |
| 2005/0135217 A1* | 6/2005 | Tateishi et al. ................ 369/103 |
| 2006/0192866 A1* | 8/2006 | Taguchi ........................ 348/246 |

FOREIGN PATENT DOCUMENTS

| JP | 11-317084 A | 11/1999 |
| JP | 2000-228089 A | 8/2000 |
| JP | 2001-075463 A | 3/2001 |
| JP | 2006-252701 A | 9/2006 |
| JP | 2006-259817 A | 9/2006 |

* cited by examiner

*Primary Examiner* — Joseph Haley
*Assistant Examiner* — Nicholas Lee
(74) *Attorney, Agent, or Firm* — Sughrue Mion, PLLC

(57) ABSTRACT

A two-dimensional demodulation method for reproducing a data page by means of decision feedback Viterbi detection processing from a recording medium on which a data page has been recorded as a set of a plurality of two-dimensional modulation pattern symbols each of which comprises a plurality of pixels, and which have been modulated two-dimensionally, the method comprising: a step of determining a value of pixel deviation in a reproduction image obtained by receiving light from the recording medium on an image sensor; a step of splitting an output signal of the image sensor which indicates the reproduction image of the light received from the recording medium into signal symbol data by division into blocks in accordance with the two-dimensional modulation pattern symbols; and a step of carrying out decision feedback Viterbi detection for each signal symbol data in accordance with the pixel deviation value.

19 Claims, 7 Drawing Sheets

FIG. 2
| INPUT DATA | 0 0 | 0 1 | 1 0 | 1 1 |
2:4 MODULATION PATTERN SYMBOL
FIG. 3
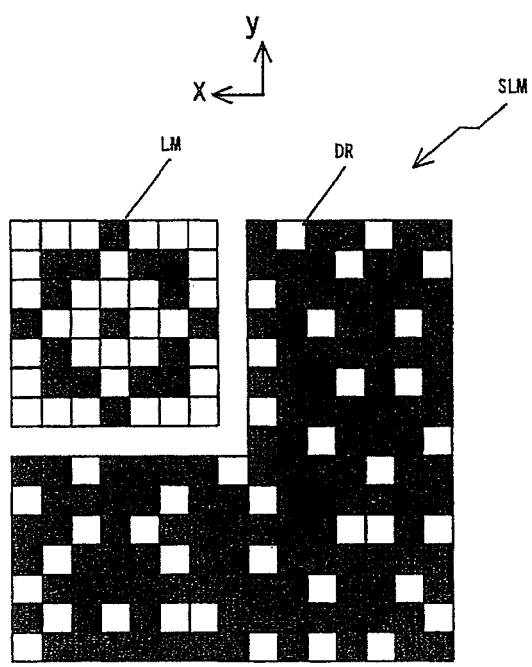
FIG. 4
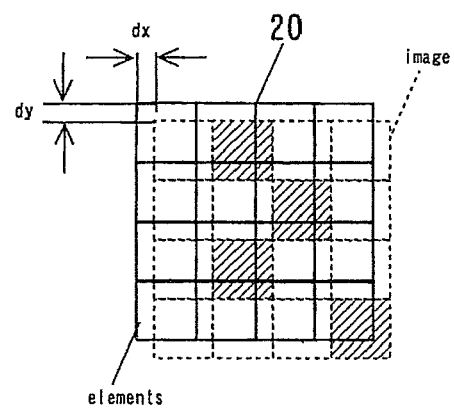

1:2 MODULATION PATTERN SYMBOL

5:9 MODULATION PATTERN SYMBOL

| INPUT DATA | 00000 | 00001 | 00010 | ... |
|---|---|---|---|---|
| |  |  |  | ... |

6:9 MODULATION PATTERN SYMBOL

TWO-DIMENSIONAL DEMODULATION METHOD, TWO-DIMENSIONAL DEMODULATION APPARATUS AND HOLOGRAPHIC APPARATUS

CROSS REFERENCE TO RELATED APPLICATION

This application is a National Stage of International Application No. PCT/JP2007/055407 filed Mar. 16, 2007, claiming priority based on Japanese Patent Application No. 2006-097563, filed Mar. 31, 2006, the contents of all of which are incorporated herein by reference in their entirety.

TECHNICAL FIELD

The present invention relates to a two-dimensional demodulation method and a two-dimensional demodulation apparatus, and more particularly to a memory system in which information is recorded to and reproduced from a recording medium by an optical system.

BACKGROUND

Holographic memory systems are known as memory systems in which information is recorded or reproduced optically to and from a holographic recording medium consisting of a photopolymer or the like.

In a holographic memory system, when data is recorded onto a holographic recording medium (hereinafter, simply called "recording medium"), two-dimensional demodulation is carried out on the basis of the input data to form units of two-dimensional data known as data pages, which are displayed on a spatial light modulator in which a plurality of pixels for modulation are arranged in a two-dimensional configuration, and the light is thereby modulated spatially to generate signal light. The signal light and a reference light beam interfere with each other on a recording medium and the corresponding interference pattern is recorded onto the recording medium.

On the other hand, when two-dimensional data is reproduced from the recording medium, a reproduction light beam (diffracted light) is generated by irradiating only the reference light beam onto the recording portion of the recording medium under the same conditions as those used during recording, and a reproduction image created by the reproduction light is received by an image sensor and the original data page is thereby reproduced.

There are cases where the original input data cannot be reproduced accurately due to deformation of the output signal as a result of the effects of noise in the holographic memory system, and therefore in order to prevent this, a method which uses a so-called decision feedback Viterbi detection process has been proposed (see Patent Document 1).

This decision feedback Viterbi detection process utilizes the fact that the data being handled is two-dimensional data and assumes that in a matrix type of image sensor comprising a plurality of photoreceptor pixels arranged in a square configuration, for example, the reproduction process has been performed accurately in the row immediately above the current row (of photoreceptor pixels) and therefore carries out Viterbi detection on the basis of the output signal from the current row while subtracting the effects of the row immediately above. In other words, decision feedback is performed in the column direction and the pattern of change in the column direction is also employed in the Viterbi detection process. For example, when reproducing the input data on the basis of the output signal received in the uppermost row, it is known that the amount of received light in the row (virtual row) further above this uppermost row is zero, and therefore, when reproducing the input data on the basis of the output signal from this uppermost row, the data is reproduced directly without alteration and no decision feedback is applied. Furthermore, when reproducing the input data on the basis of the output signal from the second row from the top, then it is assumed that in the uppermost row the input data has been reproduced on the basis of the output signal without being affected by the row further above the uppermost row, and hence the data is reproduced by subtracting the effects of the input data of the uppermost row. Moreover, when reproducing the input data on the basis of the output signal from the third row from the top, it is assumed that in the second row from the top the input data has been reproduced accurately on the basis of the output signal, and hence the data is reproduced by subtracting the effects of the input data of the second row from the top. In this case, the direction of the Viterbi detection process is the row direction from left to right, for example, in the image sensor, and the direction of the decision feedback is the column direction.

However, in the conventional decision feedback Viterbi detection process described in Patent Document 1, there is a problem in that decision feedback Viterbi detection cannot be carried out accurately from the reproduction image on the image sensor, due to the fact that the positional relationships between the respective pixels in the spatial light modulator and the corresponding pixels of the image sensor actually deviate in various directions (namely, so-called "pixel deviation" occurs). In other words, if there is a difference between the direction of the pixel deviation and the direction of decision feedback, then it is not possible to carry out decision feedback Viterbi detection.

A method has been proposed according to which, when reproducing a data page on a recording medium by using a decision feedback and Viterbi reproduction process, the direction of relative pixel deviation between one pixel in the spatial light modulator and one photoreceptor pixel in the image sensor corresponding to same is determined from the transfer function of the whole optical system, and the decision feedback direction and the state block shape in the decision feedback Viterbi reproduction processing are set on the basis of the direction of pixel deviation determined as described above (see Patent Document 2).

Viterbi detection is described in paragraphs (0120) to (0120) of Patent Document 2 and the corresponding trellis diagram, but a branch metric Bk $$B_k = (r_k - s_k)^2 \qquad \text{[Expression 1]}$$

(where $s_k$ is the ideal output of the state transition at time k) is calculated as the output result of the Viterbi detection process, and a path metric Lk $$L_K \sum_{k=1}^{K} B_k = \sum_{k=1}^{K-1} B_K + B_K = L_{K-1} + B_K \qquad \text{[Expression 2]}$$

is calculated in respect of two paths leading to the respective states Sn (n=1, . . . , 4) at time k, and the path having the smallest path metric Lk is left as the survivor path leading to the respective states.

A metrics calculation is carried out for each pixel (bit) unit, the smallest path metric is selected from all of the combinations, and the state value which constitutes this survivor path becomes the determination result for this row.

On the other hand, in a holographic memory system, a non-uniform light intensity distribution is generated in the reproduction image, due to the intensity distribution of the light source, the optical components used, and the non-uniformity of the properties of the recording medium, and other factors. Therefore, in order to prevent increasing error when judging the pixels in the data page, a two-dimensional modulation process, such as a 1:2 differential code, 2:4 differential code, or 4:8 or 6:8 balanced code, or the like is used (see Patent Document 3). Two-dimensional modulation is two-dimensional encoding which generates a bit pattern in which information bits of two types, namely, ON (bright) and OFF (dark), are arranged in a two-dimensional configuration; each of the data bits which are to be recorded is converted into a unit symbol (a two-dimensional modulation pattern symbol) consisting of the prescribed number of pixels in the spatial light modulator, and hence the input data is thereby converted into a set of a plurality of unit symbols.

Patent Document 1: U.S. Pat. No. 5,740,184
Patent Document 2: Japanese Patent Kokai No. 11-317084
Patent Document 3: Japanese Patent Kokai No. 2001-75463

If a data page is modulated two-dimensionally, then in conventional decision feedback Viterbi detection, since the detection processing advances one pixel at a time, there has been a possibility that the detection result will not match the unit symbols of the two-dimensional modulation rules (the two-dimensional modulation pattern symbols).

For example, in the case of 2:4 modulation, a modulation rule applies according to which only one pixel in a unit symbol consisting of four pixels is white and the other three pixels are black, but there are cases where the symbol resulting from decision feedback Viterbi detection contains two white pixels.

Moreover, since the result of decision feedback Viterbi detection is in a code based on the two-dimensional modulation pattern symbols, then a demodulation process for reverting to the original data is required.

Furthermore, conventionally, pixel deviation has been detected in advance, before carrying out data reproduction by the decision feedback Viterbi detection process. For example, it is detected just once when the power supply is switched or when the recording medium is changed, for instance. However, in practice, when a hologram is being reproduced, movement of the recording medium or variation in the angle of the reference light, or other such factors cause movement in the reference position of the reproduction light (reproduction image) on the image sensor, and consequently, there is variation in the optical transmission factor. In cases such as these, there is also a problem in that the decision feedback Viterbi determination does not work correctly and the error augments.

Therefore, one example of the problem to be solved by the present invention is to provide a two-dimensional demodulation method and a holographic apparatus whereby error can be reduced.

Measure Taken to Solve the Problem

The two-dimensional demodulation method according to the present invention is a two-dimensional demodulation method for reproducing a data page, by means of maximum likelihood decoding processing, from a recording medium on which the data page has been recorded as a set of a plurality of two-dimensional modulation pattern symbols, each of which comprises a plurality of pixels, and which have been modulated two-dimensionally, the method comprising: a step of determining a value of pixel deviation in a reproduction image obtained by receiving light from the recording medium on an image sensor; a step of splitting an output signal of the image sensor, which indicates the reproduction image of the light received from the recording medium, into signal symbol data by division into blocks in accordance with the two-dimensional modulation pattern symbols; and a step of carrying out maximum likelihood decoding for each of the signal symbol data in accordance with the pixel deviation value.

The two-dimensional demodulation apparatus according to the present invention is a two-dimensional demodulation apparatus which reproduces a data page by means of maximum likelihood decoding processing from a recording medium on which the data page has been recorded as a set of a plurality of two-dimensional modulation pattern symbols, each of which comprises a plurality of pixels, and which have been modulated two-dimensionally, comprising: an image sensor; means for determining a pixel deviation value for a reproduction image obtained by receiving light from the recording medium on the image sensor; means for splitting an output signal of the image sensor which indicates the reproduction image of the light received from the recording medium into signal symbol data by division into blocks in accordance with the two-dimensional modulation pattern symbols; and means for carrying out maximum likelihood decoding for each of the signal symbol data in accordance with the pixel deviation value.

The holographic apparatus according to the present invention is a holographic apparatus which reproduces a data page by means of maximum likelihood decoding processing from a recording medium on which the data page has been recorded as a set of a plurality of two-dimensional modulation pattern symbols, each of which comprises a plurality of pixels, and which have been modulated two-dimensionally, comprising: an image sensor; means for determining a pixel deviation value for a reproduction image obtained by receiving light from the recording medium on the image sensor; means for splitting an output signal of the image sensor which indicates the reproduction image of the light received from the recording medium into signal symbol data by division into blocks in accordance with the two-dimensional modulation pattern symbols; and means for carrying out maximum likelihood decoding for each of the signal symbol data in accordance with the pixel deviation value.

Maximum likelihood decoding is a method in which the decoded signal does not provide a direct representation of the original bit sequence but rather has a correlation to the preceding signal, and the original code is detected by inferring the bit sequence having the maximum likelihood, in other words, the highest probability, on the basis of this correlativity.

BRIEF DESCRIPTION OF THE DRAWINGS

FIG. 2 is a diagram describing a two-dimensional modulation table for 2:4 modulation which relates to the two-dimensional demodulation method according to an embodiment of the present invention;

FIG. 3 is a partial front diagram showing an approximate view of a spatial light demodulator in a holographic apparatus which records information on a holographic recording medium according to an embodiment of the present invention;

FIG. 4 is a partial front diagram showing a reproduction image on the photoreceptor elements of an image sensor in a holographic memory system according to an embodiment of the present invention;

Figure 1:
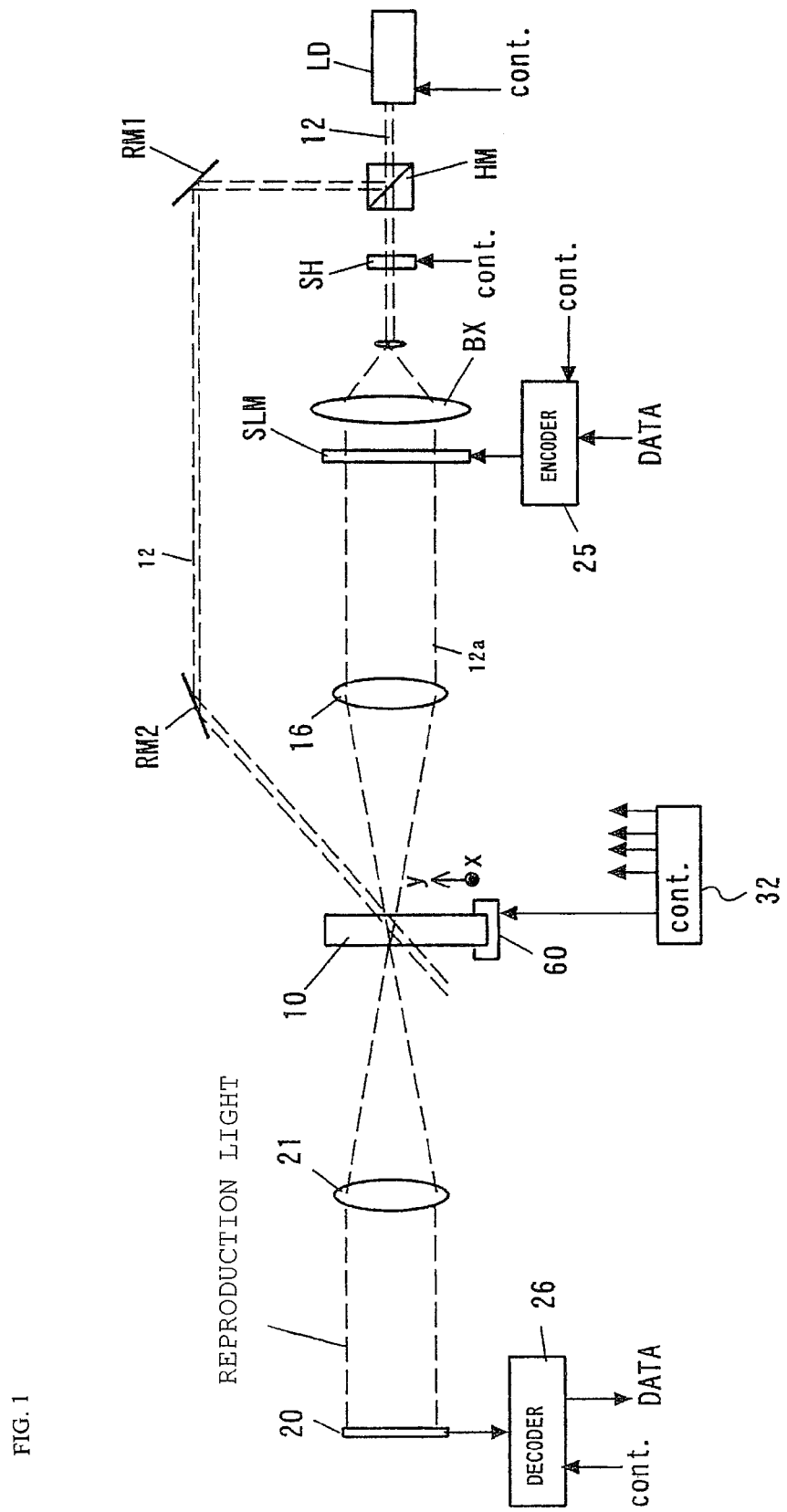
FIG. 1 is an approximate schematic drawing showing a holographic recording and reproduction system according to an embodiment of the present invention.

10 recording medium
20 image sensor
21 second lens
25 encoder
26 decoder
32 controller
16 objective lens
HM beam splitter
LD light source
SH shutter
BX beam expander
SLM spatial light modulator

MODE FOR CARRYING OUT THE INVENTION

Below, embodiments of the present invention are described with reference to the drawings.
(Holographic Apparatus)

FIG. 1 shows one example of a holographic apparatus for recording and/or reproducing information which forms a holographic memory system.

A half mirror HM, a shutter SH, a beam expander BX, a transmissive spatial light modulator SLM, an objective lens 16, a recording medium 10 made of photopolymer or the like, a second lens 21, and an image sensor 20 are disposed on the light path of coherent laser light 12 which is emitted from the laser light source LD.

The half mirror HM splits the laser light 12 in order to generate reference light, and thereby functions as a reference light optics system together with the reflective mirrors RM1, RM2.

The shutter SH is connected to the controller 32 and thereby serves to control the irradiation time of the light beam onto the recording medium 10.

The beam expander BX expands the diameter of the light passing through the shutter SH to create a parallel light beam which is irradiated onto the spatial light modulator SLM.

The spatial light modulator SLM is a panel of a transmissive type of liquid crystal display (LCD) in which a plurality of modulation pixels are arranged in a two-dimensional configuration. The spatial light modulator SLM has, for example, 480 pixels vertically by 640 pixels horizontally, and the light irradiated by displaying the data page from the encoder 25 is optically modulated into a spatial ON signal and OFF signal, which is supplied to the objective lens 16 as signal light 12a. The encoder 25 to which the data for recording, DATA, is supplied is controlled by the controller 32.

In the objective lens 16, when the shutter SH is open (during recording), the signal light 12a is subjected to a Fourier transform and is focused so as to create a focal point behind the position where the recording medium 10 is disposed.

The recording medium 10 is installed on a supporting unit 60.

The reflective mirror RM2 of the reference light optics system irradiates the reference light 12 onto the recording medium 10 at a prescribed angle of incidence. Due to the action of the reflective mirror RM2, the reference light 12 intersects with the signal light 12a at a prescribed angle inside the recording medium 10.

A data page is recorded by means of the intersecting signal light and reference light interfering with each other inside the recording medium 10 and the resulting interference pattern being recorded as a refractive index grating inside the recording medium 10. Furthermore, by altering the angle of intersection between the reference light and the signal light, it is possible to perform angle-multiplexed recording of a plurality of data pages.

The image sensor 20 is constituted by an array of CCDs (charged couple devices) or complementary metal oxide film semiconductor devices, in which a plurality of photoreceptor elements corresponding to the spatial light modulator pixels are arranged in a two-dimensional configuration. Moreover, a decoder 26 is also connected to the image sensor 20. The decoder 26 is connected to the controller 32. There does not have to be a one-to-one correspondence between the photoreceptor elements of the image sensor 20 and the pixels of the spatial light modulator, provided that photoreceptor elements are arranged in sufficient number and at suitable positions in order to be able to distinguish the respective pixels of the image of the data page which is displayed by the spatial light modulator.

When reproducing a recorded data page from the recording medium 10, the signal light is shut off by the shutter SH, and only the reference light is input, at the same angle of interference as that used during recording. Reproduction light (diffraction light) corresponding to the recorded signal light is produced on the opposite side to the incident side of the recording medium 10 onto which the reference light is irradiated. As a result, the reproduction light passes via the second lens 21 and is directed to the image sensor 20. The reproduction image created by the reproduction light is received by the image sensor 20 and reconverted into an electrical reproduction image signal, and this data, DATA, is then sent via the decoder 26 to the controller 32, where the original input data is reproduced.

(Two-Dimensional Modulation)

In a holographic apparatus, 2:4 modulation, for example, is carried out during recording as the two-dimensional modulation for holographic recording. In 2:4 modulation, when specifying a data page which is recorded by passing laser light through a spatial light modulator SLM, four mutually adjacent modulation pixels in the spatial light modulator SLM are taken as one set, and one quarter of the number of pixels constituting each set transmit light while three quarters of the pixels block off the light. As indicated by the two-dimensional modulation table shown in FIG. 2, in 2:4 modulation, the input data that is to be recorded is partitioned into two-bit units (upper row of table) and each two bits of input data is modulated into a two-dimensional modulation pattern symbol consisting of 4 bits (2×2=4 pixels) (lower row of table).

In this process, the two-dimensional modulation pattern symbol consists of four pixels of the spatial light modulator SLM, as shown in FIG. 2, and of these only one pixel transmits light while the other three pixels shield the light. There are four possibilities for which pixel position will transmit light, and therefore the number of bits which can be represented in 2:4 modulation is equivalent to 2 bits.

If it is wished to record bit sequence data using 2:4 modulation, then in the spatial light modulator SLM, for example, an arrangement of two-dimensional modulation pattern symbols is created by reading data progressively from the top left-hand side toward the right, and upon reaching the right-hand end, moving back to the left-hand end, descending one level (two pixels), and then proceeding to read out data again toward the right-hand side. In 2:4 modulation, since the number of bright bits which represent an ON bit is small, then a lower diffraction efficiency is required in the hologram in order to record one page. However, since there is also a reduced probability of the appearance of a bright bit indicating an ON bit in the pattern, then the occurrence of continuous bright bits is avoided and the concentration of low-frequency components in the Fourier transform image of the pattern is alleviated.

FIG. 3 shows a partial front diagram of a spatial light modulator SLM which displays the data page in question. The pattern of bright and dark dots is displayed by means of the voltage application states of respective cells which are either ON (bright) or OFF (dark), thus forming a pattern of transmitting and non-transmitting cells. The spatial light modulator SLM displays data (a set of two-dimensional modulation pattern symbols) in a central data region DR and depicts positioning marks LM in the four corners, for example. A transmissive type of spatial light modulator SLM is a liquid crystal panel equipped with light detectors having a plurality of pixel electrodes which are divided into a matrix configuration, the SLM being controlled electrically by the controller 32 via the encoder 25.

Generally, in order to reproduce respective pages, the light receiving area of the image sensor is set so as to be somewhat broader than the surface area onto which the reproduction image is irradiated, to account for movement of the position onto which the reproduction image is irradiated as a result of movement of the recording medium, or the like, and due to adjustment of the installation position, amongst other factors. Therefore, it is necessary to specify the area where the reproduction image is irradiated, from the output of the image sensor. On the holographically recorded data page, positioning marks LM for detecting the data positions are inserted into the page together with the modulated data, as shown in FIG. 3 (in FIG. 3, a positioning mark LM is shown in only one position, namely, the upper left-hand corner of the page, but positioning marks LM are provided in the four corners, for example).

(Two-Dimensional Demodulation)

Next, the process of reproducing the data page which has been recorded as described above will be explained with respect to a case where the 2:4 modulation shown in FIG. 2 is employed as an example of two-dimensional modulation.

FIG. 4 shows a portion of 4×4 photoreceptor elements of the image sensor 20 in a hologram memory system. dx,dy indicates the pixel deviation between the photoreceptor elements and the reproduction pixel image created by the reproduction light (or the spatial light modulator, in which case the bright and dark pixels are reversed, as indicated by dotted lines). Interference occurs between the two-dimensional pixels due to this pixel deviation and optical transmission characteristics such as the point spread function, and hence it is not possible to reproduce the original input data accurately. Therefore, in the present embodiment, as a method for determining two-dimensional data from the recording medium, rather than performing decision feedback Viterbi detection for each individual pixel, the data is expanded into two-dimensional data and a maximum likelihood decoding process, for example, decision feedback Viterbi detection, is carried out for each symbol corresponding to a two-dimensional modulation pattern symbol based on 2:4 modulation, or the like.

Figure 5:
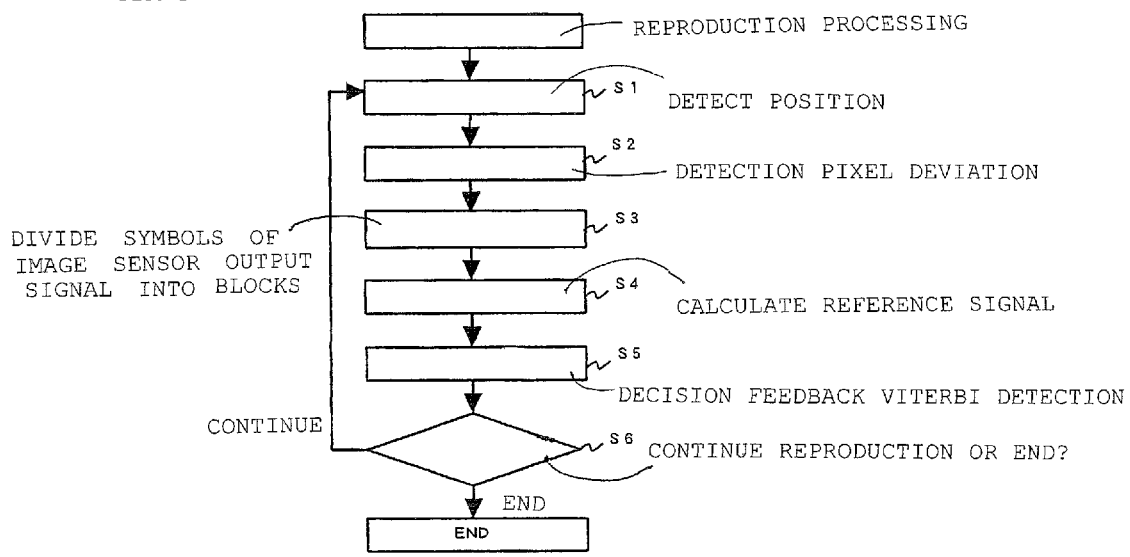
FIG. 5 is a flowchart of data page reproduction processing according to an embodiment of the present invention.

FIG. 5 shows a flowchart of a data page reproduction process in a two-dimensional demodulation apparatus which uses decision feedback Viterbi detection.

Reference light is irradiated onto the recording medium on which the data page has been recorded, and a data page signal is captured by receiving the reproduction light which appears from the recording medium, by means of an image sensor (reproduction processing).

During data reproduction, firstly, the positions of the positioning marks are detected from the data page signal (step S1).

The positions of the positioning marks are determined by calculating the correlation between a known template of the positioning marks and a prescribed section of the data page signal, for each position of the prescribed section of the data page signal, and the position at which the correlation value becomes a maximum is set as the position of the positioning marks. The result of this position determination operation is indicated in coordinates based on pixel units (integral coordinates).

Next, the pixel deviation dx, dy between the reproduction pixels and the photoreceptor elements shown in FIG. 4 is determined (step S2). This is the deviation in the relative position from the integral coordinates determined at S1 and is expressed in terms of fractional coordinates. Furthermore, the rightward direction and downward direction are taken as positive directions, and the leftward direction and upward direction are taken as negative directions. This pixel deviation can be determined by a center of gravity calculation from the maximum correlation value calculated at step S1 and the correlation values around that value. The start point and the end point of the Viterbi detection and the direction of decision feedback are determined from the integral coordinates and the fractional coordinates which were calculated in steps S1 and S2.

Apart from this, for example, it is also possible to determine the amount of pixel deviation in the positioning marks by means of a template matching technology such as that described in Japanese Patent Kokai No. 5-120436, Japanese Patent Kokai No. 10-124666 and Japanese Patent Kokai No. 2001-195597, for example.

Next, the output signal from the image sensor which indicates the reproduction signal is split into signal symbol data by being divided into blocks in accordance with the two-dimensional modulation pattern symbols for 2:4 modulation (step S3).

Figure 6:
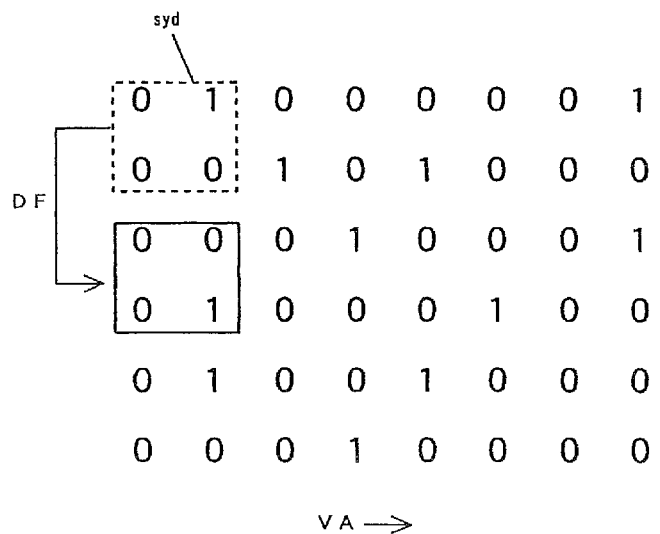
FIG. 6 is a conceptual diagram showing 4-bit signal symbol data in data page reproduction processing according to an embodiment of the present invention.

The signal is split in this way in order to carry out decision feedback Viterbi detection for each data unit of the signal symbol, syd, which consists of four bits as shown in FIG. 6 (these four bits comprise two pixels respectively in the column direction (the decision feedback direction DF from top to bottom), and the row direction (the Viterbi detection direction VA from left to right)). The reproduction image represented by the output signal of the image sensor (and developed into the memory space of the apparatus) can be split into signal symbols for each of the two-dimensional modulation pattern symbols, by, for example, dividing the output signal of one data page at equidistant intervals into a prescribed number of bits and thus splitting the data into respective symbols. In other words, the output signal of the image sensor is divided into blocks in accordance with the two-dimensional modulation pattern symbols, so as to establish signal symbol data.

Figure 7:
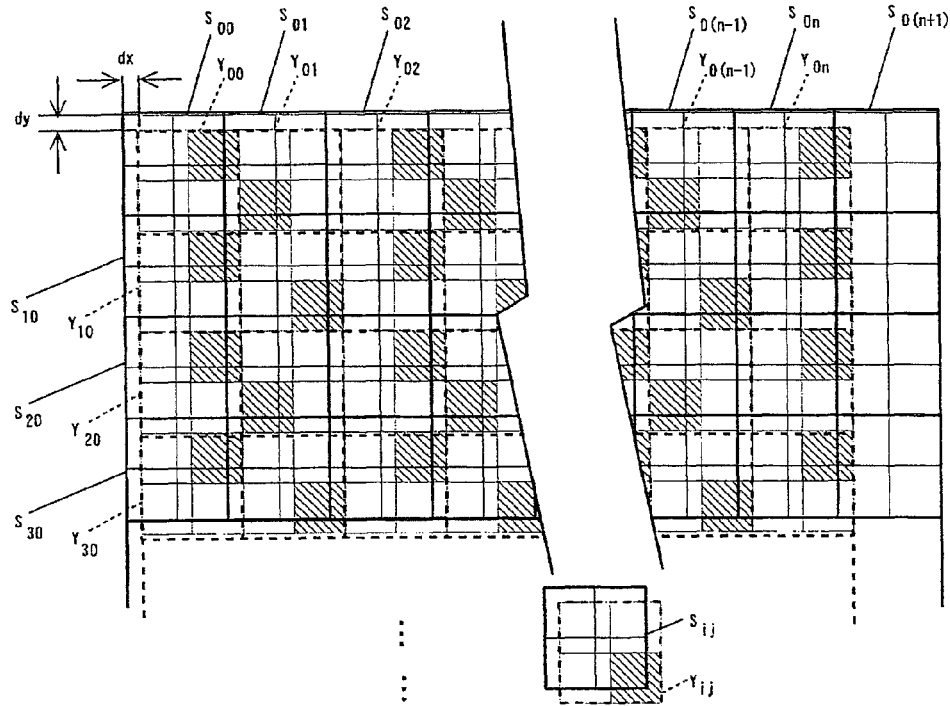
FIG. 7 is a conceptual diagram showing the relationship between a reproduction image and image symbols and signal symbols in the light receiving area of an image sensor according to an embodiment of the present invention.

For the purpose of the following description, the 2:4 modification symbol corresponding to the received light signal that is to be measured is called the signal symbol, and the 2:4 modification symbol comprising the reproduction pixel image is called the image symbol. FIG. 7 shows one example of the relationship between the reproduction image and the light receiving area of the image sensor. The dotted line represents the reproduction image, and the solid line represents the light receiving area of the image sensor. Here, $Y_{ij}$ is an image symbol which consists of four reproduction pixel images, and $S_{ij}$ is the received light signal which is actually measured, in other words, the signal symbol. In the symbol, i indicates the row number and j indicates the column number.

Firstly, the reproduction image is gathered for each image symbol as shown in FIG. 7, taking the positions of the positioning marks as reference positions. For example, in the case of 2:4 modulation, the reproduction image is divided up respectively into image symbols each comprising two pixels vertically by two pixels horizontally, and these are taken respectively to be an image symbol $Y_{ij}$ and a signal symbol $S_{ij}$ of the same size. The number of symbols per row is one greater in the case of the signal symbol S than the image symbol Y.

On the other hand, in order to perform decision feedback Viterbi detection for each symbol corresponding to the two-dimensional modulation pattern symbols for 2:4 modulation, a reference signal R is calculated in accordance with the pixel deviation (step S4).

If there is pixel deviation between the reproduction image and the light receiving area as shown in FIG. 4, then the output of the respective photoreceptor elements can be regarded as being directly proportional to the surface area of the reproduction image input to the elements. Consequently, if dx,dy is taken to be the pixel deviation value in the horizontal direction and the vertical direction respectively, then the transmission function H of the pixel deviation will be as follows.

$$H = \begin{bmatrix} (1-dx)(1-dy) & dx(1-dy) \\ (1-dx)dy & dxdy \end{bmatrix}$$ [Expression 3]

Here, if an ideal noise-free reproduction image P is represented by a matrix of pixels $P_{mn}$ in m rows and n columns as in the Expression below, then the output (reference signal) R of the image sensor that is to be measured can be calculated by R=P*H as described below. Here, * indicates a convolution calculation.

$$P = \begin{bmatrix} p_{00} & p_{01} & \cdots & \cdots & p_{0n} \\ p_{10} & p_{11} & \cdots & \cdots & p_{1n} \\ \cdots & \cdots & \cdots & \cdots & \cdots \\ \cdots & \cdots & \cdots & \cdots & \cdots \\ p_{m0} & p_{m1} & \cdots & \cdots & p_{mn} \end{bmatrix}$$ [Expression 4]

Consequently, various reference signals R can be calculated in advance in accordance with the pixel deviation.

Figure 8:
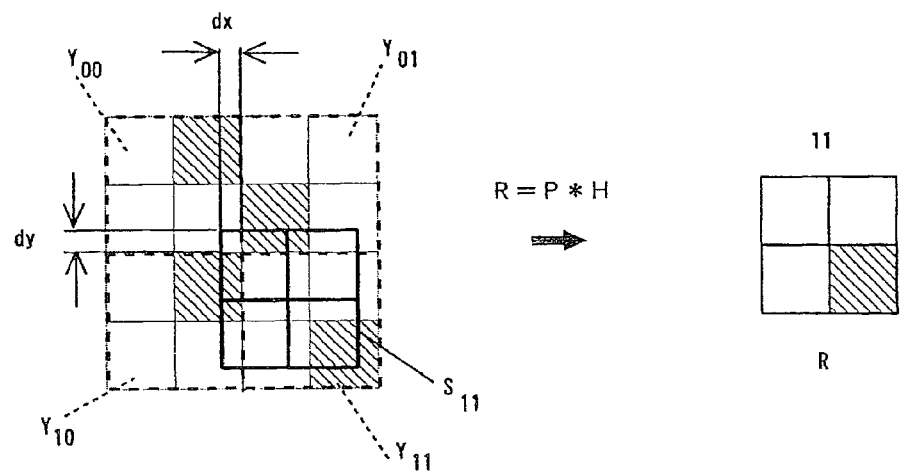
FIG. 8 is a conceptual diagram showing the relationship between image symbols and signal symbols according to an embodiment of the present invention.

For example, if the combination of four image symbols $Y_{00}$, $Y_{01}$, $Y_{10}$, $Y_{11}$ is taken as the reproduction image P as shown in FIG. 8, then the reference signal R in this case is calculated by the expression shown above.

Next, decision feedback Viterbi detection processing is carried out on the basis of the amount of pixel deviation (step S5). The decision feedback Viterbi detection process is described below.

Thereupon, it is judged whether reproduction of the data page is to be continued or ended (step S6), and if it is to be continued, then the procedure returns to step S1, whereas if reproduction is to be ended, then the procedure terminates.

Firstly, in step S4 described above, the reference signal may be calculated in advance and stored in a storage apparatus such as a memory, before the reproduction processing, and the decision feedback Viterbi detection process may be carried out by reading out the reference signal from the storage apparatus, rather than calculating the reference signal during reproduction processing.

In this case, the reference signal is calculated in advance and stored in the storage apparatus for each value of the pixel deviation (for example, every 0.1 pixels in both the lateral direction dx and the vertical direction dy), and for each combination of the four image symbols $Y_{00}$, $Y_{01}$, $Y_{10}$, $Y_{11}$ shown in FIG. 8. Here, in the case of 2:4 modulation, for instance, the possible combinations of the four image symbols $Y_{00}$, $Y_{01}$, $Y_{10}$, $Y_{11}$ involve the four two-dimensional modulation pattern symbols shown in FIG. 2 plus a completely black pattern which shields the light, in other words, they are combinations of five different two-dimensional modulation pattern symbols. Consequently, the number of combinations is 5×5×5×5=625. The reason for adding a completely black pattern which shields the light is because there are portions (completely black portions) where no reproduction light is illuminated, adjacent to the image symbol at the first end. A conceptual description of the calculation of the reference signal has been given above with reference to the drawings, and the reference signal R is stored as a signal which represents two rows and two columns: $r_{00}$, $r_{01}$, $r_{10}$, $r_{11}$.

Since a reference signal conversion table which indicates a reference signal corresponding to a pixel deviation value is created and stored in this way, in other words, since the reference signal is previously calculated and input to the storage apparatus, then the amount of calculation involved in the Viterbi detection operation can be reduced.

Specifying the image symbols and signal symbols of the same size in another two-dimensional modulation pattern symbol apart from just 2:4 modulation is effective in that it enables Viterbi detection to be carried out for a group of several pixels and not one pixel at a time.

In any case, a plurality of reference signals corresponding respectively to a plurality of prescribed pixel deviation values relating to respective image symbols are calculated and are stored in a storage apparatus, such as a RAM (Random Access Memory) or the controller 32, or the like (reference signal conversion table).

(Decision Feedback Viterbi Detection)

Next, the method of performing decision feedback Viterbi detection of the obtained image sensor output signal will be described.

Firstly, Viterbi demodulation is carried out on the basis of the detected pixel deviation value and the data in the uppermost row shown in FIG. 7, by referring to the reference signal conversion table of the storage apparatus in order to find the corresponding reference signal.

When detecting the uppermost row shown in FIG. 7, the row immediately above is a portion where reproduction light is not irradiated and therefore it is completely black.

Since the pixel deviation values dx, dy have been determined and the row above is already known, then if the pixels of the two-dimensional modulation pattern symbol to the right-hand side of the image symbol $Y_{00}$ are determined, this means that the reference signal R is determined. In this case, the pixels of the two-dimensional modulation pattern symbols on the left-hand side of the image symbol $Y_{00}$ are black, in a similar fashion.

Figure 9:
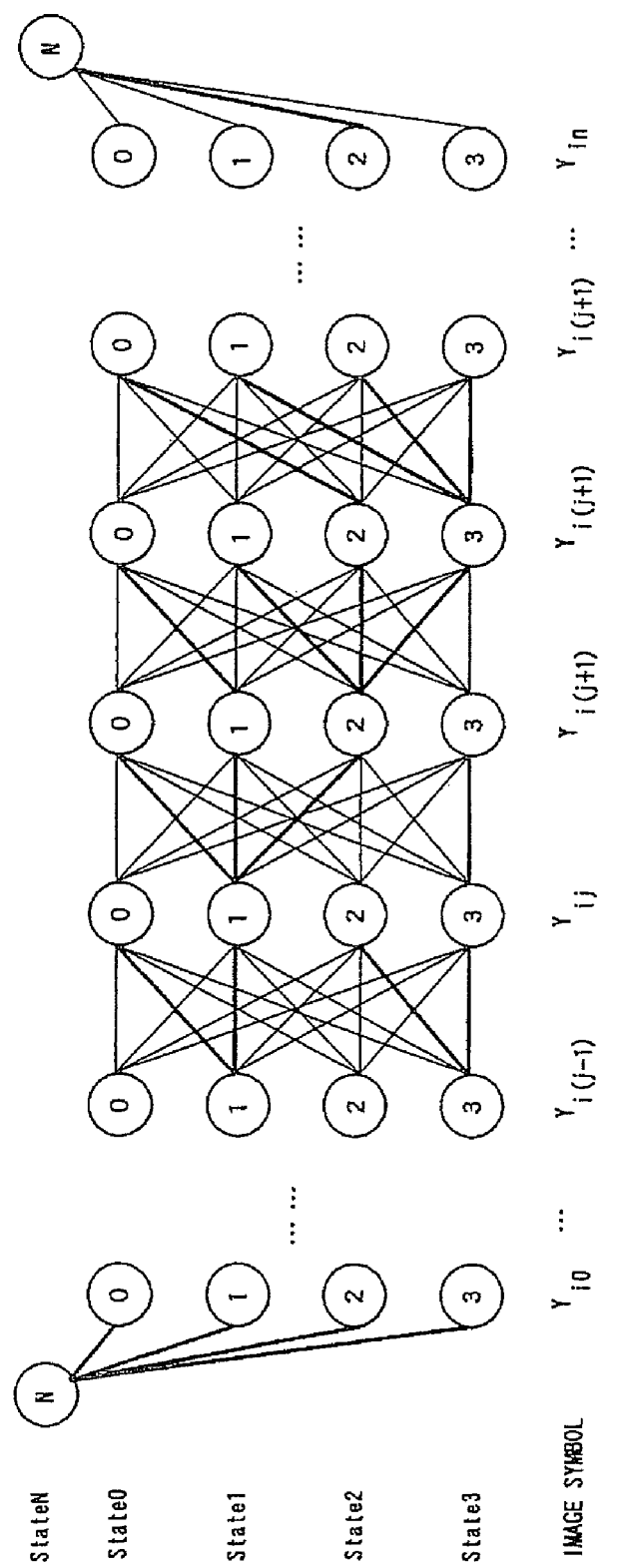
FIG. 9 is a trellis diagram based decision feedback Viterbi detection for each two-dimensional demodulation pattern symbol according to an embodiment of the present invention.

FIG. 9 is a trellis diagram created by decision feedback Viterbi detection of each two-dimensional modulation pattern symbol according to the present embodiment, which represents the relationship between the image symbol $Y_{ij}$ and the image symbol to the left-hand side $Y_{i(j-1)}$. The number of states of the image symbol, IMAGE SYMBOL, in the trellis diagram corresponds to the number of two-dimensional modulation pattern symbols shown in FIG. 2. Furthermore, the state numbers State 0, 1, 2, 3 correspond to the two-dimensional modulation rule, in other towards, the input data 00, 01, 10, 11 in FIG. 2. There are 16 types of pattern comprising 2 vertical×2 horizontal pixels (the symbol size in 2:4 modulation), but of these, only the four patterns shown in FIG. 2 are selected as states in the trellis diagram. Further in front of the very first image symbol and further after the very last image symbol are regions where no reproduction light is irradiated and no reproduction image is formed, and therefore this state (completely black pattern) is set provisionally to N.

Since the pixel deviation values dx,dy have been determined and the row above is already known, then initially the reference signals R of the (four) combinations of the completely black pattern and the image symbols $Y_{i0}$ are read out from the reference signal conversion table of the storage apparatus where they were previously calculated and stored, and four branch metrics $b_0$ and path metrics Lo are calculated from these reference signals R and the actual signal that is to be measured (signal symbol $S_{i0}$). Viterbi detection is carried out by calculating metrics for each two-dimensional modulation pattern symbol, rather than for each individual pixel. The branch metrics and path metrics are described hereinafter.

Next, the reference signals R of the (16 different) combinations of the image symbols $Y_{i0}$ and $Y_{i1}$ are read out from the storage apparatus, and 16 branch metrics $b_1$ and path metrics $L_1$ are calculated in a similar fashion. Thereupon, similar calculation is carried out progressively, and ultimately, four branch metrics and path metrics are calculated for the (four different) combinations of the image symbol $Y_{in}$ and the completely black pattern.

Each of the respective straight lines between the image symbols $Y_{i(j-1)}$ and $Y_{ij}$ of the trellis diagram shown in FIG. 9 represents a combination of the image symbols $Y_{i(j-1)}$ and $Y_{ij}$, and therefore the reference signal R is decided for each of these lines. The branch metric is defined by comparing the reference signal R for each line with the signal that is actually to be measured (the signal symbol $S_{i0}$). In other words, the branch metric represents the correlation between the (reference signal of the) combination of symbols and the actual reproduction image. The path metric corresponds to successively joined branch metrics, in other words, it represents the correlation of the whole symbol sequence for one row.

If the branch metrics are calculated using Formula 1 below, then the smaller the value, the higher the resulting correlation, and therefore the smallest path metric is selected from all of the combinations and the state value constituting that path is taken as the optimal detection result. This state value is the input data of the two-dimensional modulation rule for the 2:4 modulation shown in FIG. 2, and therefore the detection value is data which has been demodulated in respect of 2:4 modulation.

A Viterbi algorithm is used to choose the smallest path metric from all of the combinations.

When detecting the next row, since the previous row has already by detected, then a similar detection procedure to that described above is followed.

(Metric Calculation)

The branch metric $b_j$ and the path metric $L_j$ in the image symbol $Y_{ij}$ are represented by (Formula 1) below. Here, since the symbol is a 2:4 modulation symbol, then the reference signal R and the signal that is actually to be measured (signal symbol $S_{ij}$) is represented by the matrix in the formula given below. Here, the values $r_{10}$, $r_{01}$, $r_{10}$, $r_{11}$ of R represent the pixels which make up the reference signal, the values $s_{00}$, $s_{01}$, $s_{10}$, $s_{11}$ of $S_{ij}$ represent the pixels which make up the signal symbol, and $s_{mn}$ and $r_{mn}$ are general terms for $s_{00}$, $s_{01}$, $s_{10}$, $s_{11}$ and $r_{00}$, $r_{01}$, $r_{10}$, $r_{11}$, respectively.

$$R = \begin{bmatrix} r_{00} & r_{01} \\ r_{10} & r_{11} \end{bmatrix}, \qquad \text{[Expression 5]}$$

$$S_{ij} = \begin{bmatrix} s_{00} & s_{01} \\ s_{10} & s_{11} \end{bmatrix}$$

$$b_j = \sum_{m=0}^{1} \sum_{n=0}^{1} (s_{mn} - r_{mn})^2 \qquad \text{[Expression 6]}$$

$$L_j = \sum_{i=0}^{j} b_i = L_{j-1} + b_j \qquad \text{(Formula 1)}$$

By adopting this approach, the reference signal and the signal that is actually to be measured (signal symbol Si0) are compared for each two-dimensional modulation pattern symbol, and therefore in the case of the 2:4 modulation described above, for example, since a symbol is constituted by 2 vertical pixels×2 horizontal pixels, then the detection process advances in units of respective 4-bit symbols (2 pixels each in column direction and row direction) as shown in FIG. 6, and since the metric calculation carried out at this stage determines the difference between the reference signal and the signal symbol, or stated differently, since the reference signal sequence which most closely resembles the signal symbol sequence (measurement output) is identified, then the Viterbi detection result necessarily coincides with the two-dimensional modulation rule. Consequently, the error rate is improved in comparison with the Viterbi detection for each pixel.

Furthermore, since the states of the image symbols in the trellis diagram are made to correspond to the two-dimensional modulation rule, then the detection result provides the actual data itself and no demodulation process is required. In this way, the Viterbi detection and demodulation processes which are separate in the prior art are combined into one process.

Moreover, in the prior art it was considered that the amount of light received is zero in the row further above the uppermost row of the portion where the reproduction signal is irradiated, or in the row further below the bottommost row of this portion, but by additionally taking account of the fact that the region in front of the first image symbol and the region after the last image symbol do not receive the irradiation of reproduction light, then the error rate of the Viterbi detection process is improved.

Furthermore, the reference signals used in Viterbi detection are previously created for combinations of pixel deviation in the vertical and horizontal directions, and the pixel deviation is detected each time a data page is reproduced and the corresponding reference signal is referenced and reflected in the Viterbi detection process. Therefore, even if there are subtle movements in the irradiation position of the reproduction light due to reasons such as movement of the recording medium, variation in the angle of the reference light, or the like, the Viterbi detection process will still work correctly and accurately.

Figure 10:
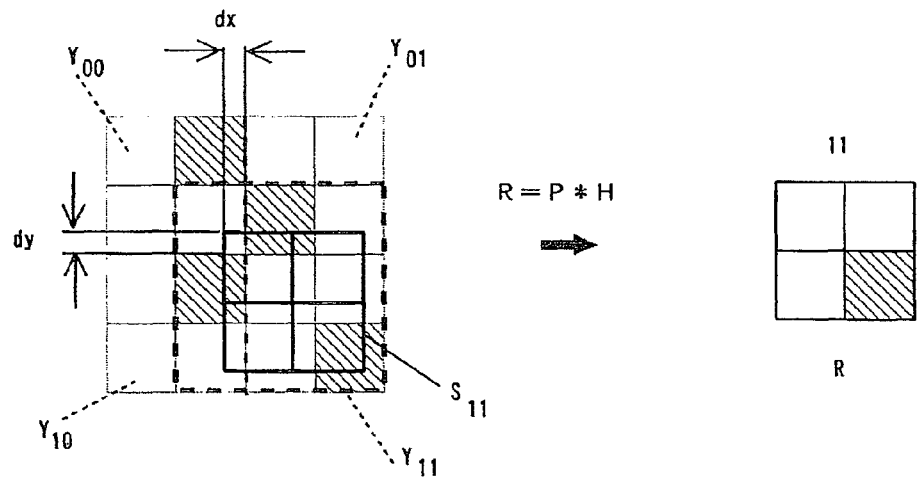
FIG. 10 is a conceptual diagram describing the relationship between image symbols and signal symbols according to a further embodiment of the present invention.

In order to simplify the description, in the present embodiment, the reference signal was calculated on the basis of four image symbols as shown in FIG. 8 in the case of 2:4 modulation described above, but since the symbol interference caused by pixel deviation is affected only by one adjacent pixel, then it is sufficient to calculate inside the thick dotted line shown in FIG. 10. In other words, the reference signal is calculated from the lower right pixel of the image symbol $Y_{00}$ in FIG. 10, the two lower pixels of the image symbol $Y_{01}$, the two right-side pixels of the image symbol $Y_{10}$ and the image symbol $Y_{11}$. Therefore, it is possible to reduce the number of combinations of the reference signals and the memory space of the storage apparatus which stores the reference signals can be reduced. Furthermore, the branch metrics are also calculated using a combination of the two right-side pixels of the image symbol $Y_{10}$ and the image symbol $Y_{11}$. For example, since the input data 00 and 10 in FIG. 2 have the same modulation pattern in the two right-side pixels, then it is sufficient to calculate the branch metrics for the combinations of states 0·1·3 of $Y_{i(j-1)}$ and states 0·1·2·3 of $Y_{ij}$ in FIG. 9. This means that the calculational load can also be reduced.

Figure 12:
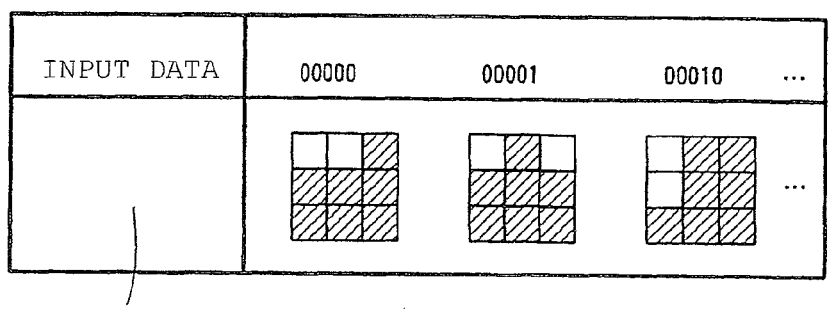
FIG. 12 is a diagram showing one portion of a two-dimensional modulation table for 5:9 modulation relating to the two-dimensional demodulation method according to a further embodiment of the present invention.
Figure 13:
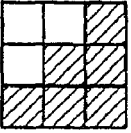
FIG. 13 is a diagram showing one portion of a two-dimensional modulation table for 6:9 modulation relating to the two-dimensional demodulation method according to a further embodiment of the present invention.
Figure 13:
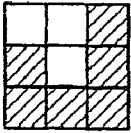
Figure 13:
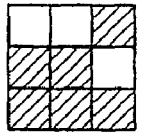

In the embodiment described above, 2:4 modulation was given as one example, but it is also possible to perform modulation by taking 3×3=9 pixels as one symbol, or by taking 4×4=16 pixels as one symbol, as shown in FIG. 12 and FIG. 13. It is necessary that M bits be converted into symbols comprising N pixels in a two-dimensional arrangement. In other words, the two-dimensional modulation process may use M:N modulation rather than 2:4 modulation, and comprise: a step of grouping the data to be recorded into respective sets of M bits (where M<N and M is an integer), a step of creating a data page by implementing two-dimensional modulation which allocates N-bit data to each symbol on the basis of a two-dimensional modulation table, for each group of M bits; and a step of driving a spatial light modulator in accordance with the data page. Here, the value M in M:N modulation indicates the number of bits in the input data, and N indicates the number of pixels in the modulation pattern; the number of modulation patterns is $2^M$. For example, in the case of 5:9 modulation, Viterbi detection proceeds three pixels at a time in the column direction and the row direction. In this case, the number of states is $2^5=32$. In the case of 6:9 modulation, Viterbi detection proceeds three pixels at a time in the column direction and the row direction and the number of states in this case is $2^6=64$.

Figure 11:
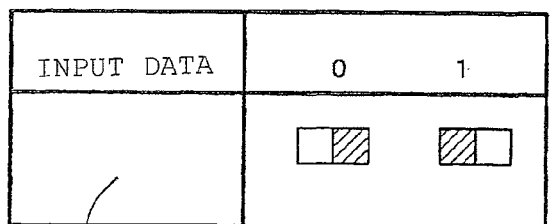
FIG. 11 is a diagram showing a two-dimensional modulation table for 1:2 modulation relating to the two-dimensional demodulation method according to a further embodiment of the present invention.

FIG. 11 shows a two-dimensional modulation table for 1:2 modulation. FIG. 12 shows a two-dimensional modulation table for 5:9 modulation, and FIG. 13 shows a two-dimensional modulation table for 6:9 modulation.

Furthermore, in the embodiment described above, the decision feedback direction was from top to bottom and the Viterbi detection direction was from left to right, but the decision feedback direction may also be from bottom to top and the Viterbi detection direction may also be from right to left, and so on.

Moreover, in the embodiment described above, a holographic memory system was described in which a holographic recording medium was used as a two-dimensional modulation apparatus, but the present invention is not limited to this and it may also be applied to a two-dimensional modulation apparatus in a two-dimensional code reading apparatus for reading various types of bar codes and two-dimensional codes.

Furthermore, in the embodiment described above, a decision feedback Viterbi detection process was described as one example of a maximum likelihood decoding process for symbols, but similar beneficial effects are also obtained if using another maximum likelihood decoding method, such as a BCJR decoding method (see L. R. Bahl, J. Cocke, F. Jelinek, J. Raviv, "Optimal decoding of linear codes for minimizing symbol error rate," IEEE Transactions on Information Theory, March 1974, pp. 284 to 287).

The invention claimed is:

1. A two-dimensional demodulation method for reproducing a data page, by means of maximum likelihood decoding processing, from a recording medium on which the data page has been recorded as a set of a plurality of two-dimensional modulation pattern symbols, each of which comprises a plurality of pixels, and which have been modulated two-dimensionally, the method comprising:
a step of determining a value of pixel deviation in a reproduction image obtained by receiving light from the recording medium on an image sensor;
a step of splitting an output signal of the image sensor, which indicates the reproduction image of the light received from the recording medium, into signal symbol data by division into blocks in accordance with the two-dimensional modulation pattern symbols; and
a step of carrying out maximum likelihood decoding for each of the signal symbol data in accordance with the pixel deviation value.

2. The two-dimensional demodulation method according to claim 1, wherein the two-dimensionally modulated data page is created by means of a step of grouping data to be recorded into respective groups of M bits, and a step of creating the data page by carrying out two-dimensional modulation for allocating N bit data to each symbol on the basis of a two-dimensional modulation table, for each group of M bits (where M<N, and M and N are integers).

3. The two-dimensional modulation method according to claim 2, further comprising: a step of calculating a plurality of reference signals in accordance with the pixel deviation value; and a step of creating and storing a reference signal conversion table which indicates the reference signal corresponding to the pixel deviation value, wherein maximum likelihood decoding is carried out for each of the signal symbol data by referring to the reference signal conversion table in accordance with the pixel deviation value.

4. The two-dimensional modulation method according to claim 1, further comprising: a step of calculating a plurality of reference signals in accordance with the pixel deviation value; and a step of creating and storing a reference signal conversion table which indicates the reference signal corresponding to the pixel deviation value, wherein maximum likelihood decoding is carried out for each of the signal symbol data by referring to the reference signal conversion table in accordance with the pixel deviation value.

5. The two-dimensional demodulation method according to claim 1, wherein the image sensor is a matrix type of sensor, and the pixel deviation value includes a combination of pixel deviation values in the row direction and column direction of the image sensor.

6. The two-dimensional demodulation method according claim 1, wherein the maximum likelihood decoding is carried out by adding a light shielding pattern as one of the two-dimensional modulation pattern symbols in the step of splitting into signal symbol data.

7. The two-dimensional modulation method according to claim 1, wherein the initial state and the final state in a trellis diagram are taken to be the light shielding pattern, in the step of carrying out the maximum likelihood decoding.

8. The two-dimensional modulation method according to claim 1, wherein state values in a trellis diagram are made to correspond to input data in the modulation rule of the two-dimensionally modulated data page, in the step of carrying out the maximum likelihood decoding.

9. The two-dimensional modulation method according to claim 1, wherein the maximum likelihood decoding uses decision feedback Viterbi detection.

10. A two-dimensional demodulation apparatus which reproduces a data page by means of maximum likelihood decoding processing from a recording medium on which the data page has been recorded as a set of a plurality of two-dimensional modulation pattern symbols, each of which comprises a plurality of pixels, and which have been modulated two-dimensionally, comprising:
an image sensor;
a component which determines a pixel deviation value for a reproduction image obtained by receiving light from the recording medium on the image sensor;
a component which splits an output signal of the image sensor which indicates the reproduction image of the light received from the recording medium into signal symbol data by division into blocks in accordance with the two-dimensional modulation pattern symbols; and
a component which carries out maximum likelihood decoding for each of the signal symbol data in accordance with the pixel deviation value.

11. The two-dimensional demodulation apparatus according to claim 10, further comprising: a light source which emits coherent light; a component which generates reference light from the coherent light; a component which generates signal light including a data page by means of a spatial light modulator; and an irradiation component which projects the reference light and the signal light onto the recording medium.

12. The two-dimensional demodulation apparatus according to claim 11, wherein said component which carries out maximum likelihood decoding performs a maximum likelihood decoding for each of the signal symbol data by referring to a reference signal conversion table which indicates a plurality of reference signals respectively corresponding to each pixel deviation value in accordance with the pixel deviation value.

13. The two-dimensional demodulation apparatus according to claim 10, wherein said component which carries out maximum likelihood decoding performs a maximum likelihood decoding for each of the signal symbol data by referring to a reference signal conversion table which indicates a plurality of reference signals respectively corresponding to each pixel deviation value in accordance with the pixel deviation value.

14. The two-dimensional modulation apparatus according to claim 10, wherein the maximum likelihood decoding uses decision feedback Viterbi detection.

15. A holographic apparatus which reproduces a data page by means of maximum likelihood decoding processing from a recording medium on which the data page has been recorded as a set of a plurality of two-dimensional modulation pattern symbols, each of which comprises a plurality of pixels, and which have been modulated two-dimensionally, comprising:
an image sensor;
a component which determines a pixel deviation value for a reproduction image obtained by receiving light from the recording medium on the image sensor;
a component which splits an output signal of the image sensor which indicates the reproduction image of the light received from the recording medium into signal symbol data by division into blocks in accordance with the two-dimensional modulation pattern symbols; and
a component which carries out a maximum likelihood decoding for each of the signal symbol data in accordance with the pixel deviation value.

16. The holographic apparatus according to claim 15, further comprising: a light source which emits coherent light; a component which generates reference light from the coherent light; a component which generates signal light including a data page by means of a spatial light modulator; and an irradiation component which projects the reference light and the signal light onto the recording medium.

17. The holographic apparatus according to claim 16 wherein said component which carries out maximum likelihood decoding performs a maximum likelihood decoding for each of the signal symbol data by referring to a reference signal conversion table which indicates a plurality of reference signals respectively corresponding to each pixel deviation value in accordance with the pixel deviation value.

18. The holographic apparatus according to claim 15, wherein said component which carries out maximum likelihood decoding performs a maximum likelihood decoding for each of the signal symbol data by referring to a reference signal conversion table which indicates a plurality of reference signals respectively corresponding to each pixel deviation value in accordance with the pixel deviation value.

19. The holographic apparatus according to claim 15, wherein the maximum likelihood decoding uses decision feedback Viterbi detection.

* * * * *